United States Patent
Yang

(10) Patent No.: US 10,192,375 B1
(45) Date of Patent: Jan. 29, 2019

(54) TWO-FACTOR AUTHENTICATION PATTERN-BASED DOOR LOCK CONTROL METHOD AND TWO-FACTOR AUTHENTICATION PATTERN-BASED DOOR LOCK

(71) Applicant: Hae Sung Yang, Seoul (KR)

(72) Inventor: Hae Sung Yang, Seoul (KR)

( * ) Notice: Subject to any disclaimer, the term of this patent is extended or adjusted under 35 U.S.C. 154(b) by 0 days.

(21) Appl. No.: 15/826,917

(22) Filed: Nov. 30, 2017

(30) Foreign Application Priority Data

Sep. 29, 2017 (KR) .......................... 10-2017-0127574

(51) Int. Cl.
| | |
|---|---|
| *G07C 9/00* | (2006.01) |
| *H04L 12/26* | (2006.01) |
| *H04L 29/06* | (2006.01) |
| *E05B 45/06* | (2006.01) |
| *H04L 29/08* | (2006.01) |
| *H04W 12/06* | (2009.01) |
| *E05B 47/00* | (2006.01) |

(52) U.S. Cl.
CPC .......... *G07C 9/00126* (2013.01); *E05B 45/06* (2013.01); *H04L 63/107* (2013.01); *H04L 67/12* (2013.01); *H04W 12/06* (2013.01); *E05B 2047/0068* (2013.01); *G05B 2219/2642* (2013.01); *G07C 2209/63* (2013.01)

(58) Field of Classification Search
CPC ....... H04W 12/08; H04W 12/06; H04W 4/02; H04W 4/025; H04W 4/80; H04W 4/38; H04L 12/2818; H04L 63/0861; H04L 63/0869; H04L 67/18; H04L 63/107; H04L 67/12; G06Q 10/087; G06Q 10/08; G05B 2219/2642; G06K 9/00288; G06K 9/00362; G07C 2209/63
See application file for complete search history.

(56) References Cited

U.S. PATENT DOCUMENTS

| | | | |
|---|---|---|---|
| 9,512,643 B1 * | 12/2016 | Keefe ...................... | E05B 47/06 |
| 2015/0222517 A1 * | 8/2015 | McLaughlin ........... | H04W 4/70 |
| | | | 713/156 |
| 2016/0005250 A1 * | 1/2016 | Inoue .................... | B60R 25/209 |
| | | | 701/2 |
| 2016/0053517 A1 * | 2/2016 | Tomaszewski ......... | E05B 77/26 |
| | | | 200/573 |
| 2016/0343189 A1 * | 11/2016 | Dumas ............... | G07C 9/00309 |
| 2018/0061220 A1 * | 3/2018 | Greene ............. | G06K 9/00288 |

* cited by examiner

*Primary Examiner* — Dionne H Pendleton
(74) *Attorney, Agent, or Firm* — STIP Law Group, LLC

(57) ABSTRACT

The present invention relates to a two-factor authentication pattern-based door lock control method and a two-factor authentication pattern-based door lock that converts a locked state of a door lock to a released state thereof or maintains the released state of the door lock if additional authentication of a user is not performed, thereby allowing the user to have a help from an outsider (acquaintance, neighbor, security staff, guard, police officer, fire fighter, and so on) in an emergency situation where the user is trapped in an indoor space by an invader.

10 Claims, 15 Drawing Sheets

TWO-FACTOR AUTHENTICATION PATTERN-BASED DOOR LOCK CONTROL METHOD AND TWO-FACTOR AUTHENTICATION PATTERN-BASED DOOR LOCK

CROSS-REFERENCE TO RELATED APPLICATIONS

This application claims the priority of the Korean Patent Applications NO. 10-2017-0127574 filed on Sep. 29, 2017 in the Korean Intellectual Property Office, the disclosure of which is incorporated herein by reference.

BACKGROUND OF THE INVENTION

Field of the Invention

The present invention relates to a two-factor authentication pattern-based door lock control method and a two-factor authentication pattern-based door lock, and more particularly, to a two-factor authentication pattern-based door lock control method and a two-factor authentication pattern-based door lock that converts a locked state of a door lock to a released state thereof or maintains the released state of the door lock if additional authentication of a user is not performed, thereby allowing the user to have a help from an outsider (acquaintance, neighbor, security staff, guard, police officer, fire fighter, and so on) in an emergency situation where the user is trapped in an indoor space by an invader.

Particularly, the present invention relates to a two-factor authentication pattern-based door lock control method and a two-factor authentication pattern-based door lock that adds authentication means to an indoor module of the door lock and controls the door lock on the basis of an authentication pattern in the order of outdoor authentication, indoor authentication, and opening and closing of a door, thereby safely protecting a user's properties and body from an emergency situation.

Background of the Related Art

A door lock is largely classified into a mechanic door lock for opening and closing a door with a metal key and a digital door lock for opening and closing a door with an electronic key, and generally, the digital door lock is widely used because it provides high security and convenience.

The digital door lock sets a locked state of a door or releases the locked state using password input, a magnetic card, an IC card, and so on and recently, a biometric recognition technology using unique physical characteristics, such as voice, fingerprints, face, iris, and so on has been developed.

As one of conventional door lock devices, there is proposed a door lock having an electric cover and a method for opening and closing the cover as disclosed in Korean Patent Registration No. 10-0919289, wherein two authentication means are sequentially open and closed to perform the corresponding authentication.

In addition to the above-mentioned conventional technology, most of technologies known up to now are related to authentication means for locking and releasing a door lock and an authentication method using the same.

That is, the technologies known up to now have been developed focusedly with respect to the kind of authentication means used by a user and a door opening method.

However, one of fundamental problems of the digital door lock happens after the locked state of the door has been released, which will be in detail explained below.

In case of most of door locks, if the user closes a door after opens the door to enter his or her house, there is a time gap until the door lock operates after the door is closed.

During such time gap, an outsider may enter the house, thereby causing a dangerous situation where the user is under the threat of the outsider as an invader.

Especially, if the outsider enters the house along with the user when the door is open and closed, the door lock is operated, and if a situation, where the user does not release the locked state of the door lock by oppressing the outsider, occurs, the indoor space is completely blocked from the outdoor space, so that the user does not have any help from someone outside his or her house.

Contrarily, if an outsider pushes the user to enter the user's house along with the user at the moment when the user goes out, or if an invader disguised as a visitor like a delivery man enters the house, the same problems as mentioned above and the similar problems thereto may occur.

As the number of women living alone is increased together with the increment of one-person households, recently, the door lock has had a weakness causing the user to be exposed to his or her physical danger as well as his or her property damage, which is considered as a very serious social problem.

In case of the door lock used generally, on the other hand, the locked state of the door lock is released through the password input at the outside of the house, and accordingly, the password is exposed by a hidden camera installed by an invader at the outside of an entrance of the house, thereby causing the invader to enter the house.

Like this, even when the user enters the house in the state where the password is exposed to cause the invader to already enter the house, the locking function of the door lock is operated, and accordingly, if the locked state of the door lock is not released, the indoor space is completely blocked from the outdoor space, thereby causing the user to be in danger.

Even in case where any authentication means and method are used, accordingly, if the invader immediately enters the house along with the user when the user comes back home, if the invader pushes the user to enter the house together with the user, or if the invader disguised as the visitor like a delivery man enters the house, there is no method for preventing the invasion. Further, there is no solution for the situation where the invader has already entered the user's house.

So as to solve the above-mentioned problems, a separate crime prevention system has to be built, but actually, it is impossible to build a high-priced crime prevention system for detached houses, especially, for studio apartments for one-person households, thereby causing the users (residents) to be unavoidably exposed to dangerous situations.

SUMMARY OF THE INVENTION

Accordingly, the present invention has been made in view of the above-mentioned problems occurring in the prior art, and it is an object of the present invention to provide a two-factor authentication pattern-based door lock control method and a two-factor authentication pattern-based door lock that adds authentication means to an indoor module of the door lock and converts a locked state of the door lock to a released state or maintains the released state of the door lock if the additional authentication of a user is not performed, thereby allowing the user to have a help from an outsider (acquaintance, neighbor, security staff, guard, police officer, fire fighter, and so on) in an emergency situation where the user is trapped in an indoor space by an invader.

It is another object of the present invention to provide a two-factor authentication pattern-based door lock control method and a two-factor authentication pattern-based door lock that controls the door lock on the basis of an authentication pattern in the order of outdoor authentication, indoor authentication, and opening and closing of a door, thereby safely protecting a user's properties and body from an emergency situation.

It is yet another object of the present invention to provide a two-factor authentication pattern-based door lock control method and a two-factor authentication pattern-based door lock that additionally obtains authentication standby time through extension authentication if a door has to be open for a given period of time, or inputs cheating numbers to perform an alarm operation, while giving a relief to an invader, if authentication numbers are forcedly inputted by a user under the threat of an invader, thereby actively coping with various situations.

To accomplish the above-mentioned objects, according to the present invention, there is provided a two-factor authentication pattern-based door lock control method, including: the first authentication checking step of checking, if any one of outdoor authentication and indoor authentication is normally performed, justification and position of first authentication as the corresponding authentication; the door opening and closing checking step of checking whether a door is open and closed sequentially; the second authentication checking step of checking whether second authentication is performed within a given period of time after the door is open or closed and of checking a location where the second authentication is performed; and the step of determining whether the locked state is maintained, on the basis of the checked location of the first authentication, the checked door opening and closing, the checked result for the performance of the second authentication, and the location of the second authentication.

According to the present invention, desirably, the step of determining whether the locked state is maintained is performed by converting the released state of the door lock into the locked state if the location of the first authentication is an outdoor side and the opening and closing of the door are performed within normal entering time, maintaining the locked state of the door lock if normal authentication is performed at an indoor side as the location of the second authentication, and by releasing the locked state of the door lock if the normal authentication is not performed at the indoor side as the location of the second authentication.

According to the present invention, desirably, the step of determining whether the locked state is maintained is performed by maintaining the released state of the door lock if the location of the first authentication is an outdoor side and the opening and closing of the door are performed within normal entering time, converting the released state of the door lock into the locked state if normal authentication is performed at an indoor side as the location of the second authentication, and by maintaining the released state of the door lock if the normal authentication is not performed at the indoor side as the location of the second authentication.

According to the present invention, desirably, the step of determining whether the locked state is maintained is performed by converting the released state of the door lock into the locked state if the location of the first authentication is an outdoor side and the opening and closing of the door are performed within normal entering time, maintaining the locked state of the door lock if normal authentication is performed at an outdoor side as the location of the second authentication, and by releasing the locked state of the door lock if the normal authentication is not performed at the outdoor side as the location of the second authentication.

According to the present invention, desirably, the step of determining whether the locked state is maintained is performed by maintaining the released state of the door lock if the location of the first authentication is an outdoor side and the opening and closing of the door are performed within normal entering time, converting the released state of the door lock into the locked state if normal authentication is performed at an outdoor side as the location of the second authentication, and by maintaining the released state of the door lock if the normal authentication is not performed at the outdoor side as the location of the second authentication.

According to the present invention, desirably, the step of determining whether the locked state is maintained is performed by converting the released state of the door lock into the locked state if the location of the first authentication is an indoor side and the opening and closing of the door are performed within normal entering time, maintaining the locked state of the door lock if normal authentication is performed at an outdoor side as the location of the second authentication, and by releasing the locked state of the door lock if the normal authentication is not performed at the outdoor side as the location of the second authentication.

According to the present invention, desirably, the step of determining whether the locked state is maintained is performed by maintaining the released state of the door lock if the location of the first authentication is an indoor side and the opening and closing of the door are performed within normal entering time, converting the released state of the door lock into the locked state if normal authentication is performed at an outdoor side as the location of the second authentication, and by maintaining the released state of the door lock if the normal authentication is not performed at the outdoor side as the location of the second authentication.

According to the present invention, desirably, the step of determining whether the locked state is maintained is performed by converting the released state of the door lock into the locked state if the location of the first authentication is an indoor side and the opening and closing of the door are performed within normal entering time, maintaining the locked state of the door lock if normal authentication is performed at an indoor side as the location of the second authentication, and by releasing the locked state of the door lock if the normal authentication is not performed at the indoor side as the location of the second authentication.

According to the present invention, desirably, the step of determining whether the locked state is maintained is performed by maintaining the released state of the door lock if the location of the first authentication is an indoor side and the opening and closing of the door are performed within normal entering time, converting the released state of the door lock into the locked state if normal authentication is performed at an indoor side as the location of the second authentication, and by maintaining the released state of the door lock if the normal authentication is not performed at the indoor side as the location of the second authentication.

According to the present invention, desirably, the door lock control method further includes the extension authentication standby step of standing by extension authentication through which the second authentication is extendedly performed after a given period of time if the given period of time is passed in the state where the door is open, the extension authentication standby step being performed by maintaining a current state during set extension time after the door is open if the extension authentication is normally performed and by performing an alarm operation according a set alarm processor if the extension authentication is not normally performed.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENTS

A two-factor authentication pattern-based door lock control method and a two-factor authentication pattern-based door lock according to the present invention are applicable to a variety of embodiments of the present invention, and according to preferred embodiments of the present invention, hereinafter, they will be explained with reference to the attached drawing.

Figure 1:
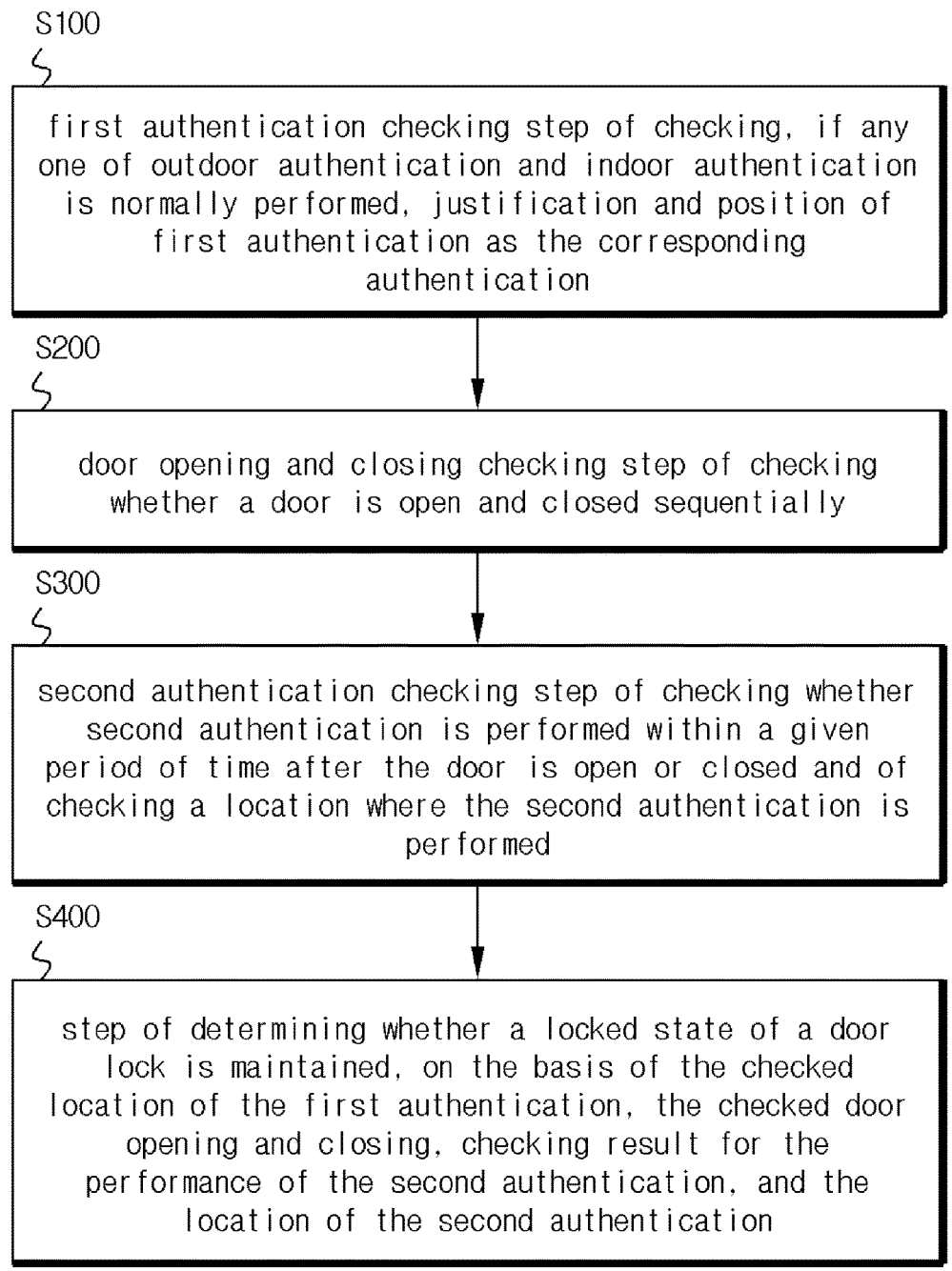
FIG. 1 is a flowchart showing a two-factor authentication pattern-based door lock control method according to a first embodiment of the present invention.

FIG. 1 is a flowchart showing a two-factor authentication pattern-based door lock control method according to a first embodiment of the present invention.

As shown in FIG. 1, a two-factor authentication pattern-based door lock control method according to a first embodiment of the present invention includes a first authentication checking step S100, a door opening and closing checking step S200, a second authentication checking step S300, and a step S400 of determining whether the locked state is maintained, and unless otherwise stated, the respective steps are performed by a control module disposed in the interior of a door lock.

The first authentication checking step S100 is a step of checking, if any one of outdoor authentication and indoor authentication is normally performed, justification and position of first authentication as the corresponding authentication, and the outdoor authentication and the indoor authentication are performed through number input using key buttons, which of course may be performed through fingerprint recognition, pattern recognition, and so on if required by a person having ordinary skill in the art.

The door opening and closing checking step S200 is a step of checking whether a door is open and closed sequentially, and accordingly, the step S200 checks whether the door is now open, closed after has been open, and how long the door is open. A method for utilizing the door opening and closing checking step will be in detail explained in the control methods according to situations as will be discussed later.

The second authentication checking step S300 is a step of checking whether second authentication is performed within a given period of time after the door is open or closed and of checking a location where the second authentication is performed. Together with the first authentication checking step S100, the second authentication checking step S300 serves as a reference of determining what is a user's purpose to open and close the door.

For example, if the location of the first authentication is an outdoor side and the location of the second authentication is an indoor side, it is determined that the user comes back home after goes out. For another example, if the location of the first authentication is the indoor side and the location of the second authentication is the outdoor side, it is determined that the user goes out. For yet another example, if the location of the first authentication is the indoor side and the location of the second authentication is the indoor side, it is determined that a visitor visits or the door is open to receive an object from home delivery service.

The step S400 of determining whether the locked state is maintained is a step of determining whether a locked state of a door lock is maintained or not, on the basis of the checked location of the first authentication, the door opening and closing, the checked result for the performance of the second authentication, and the location of the second authentication, and in this step, the locked state of the door lock is released upon specific conditions in various situations as mentioned above to prevent the user from being trapped in an indoor space by an invader in the state of being disconnected to the outside.

Upon an emergency situation, accordingly, the user requests someone to help him or her, while the door is kept open, thereby desirably inducing the invader to run away and protecting his or her properties and body from the invader.

Hereinafter, an explanation on the door lock control method according to the first embodiment of the present invention will be in more detail given according to various situations.

FIGS. 2 to 9 are flowcharts showing detailed use examples of FIG. 1.

Figure 2:
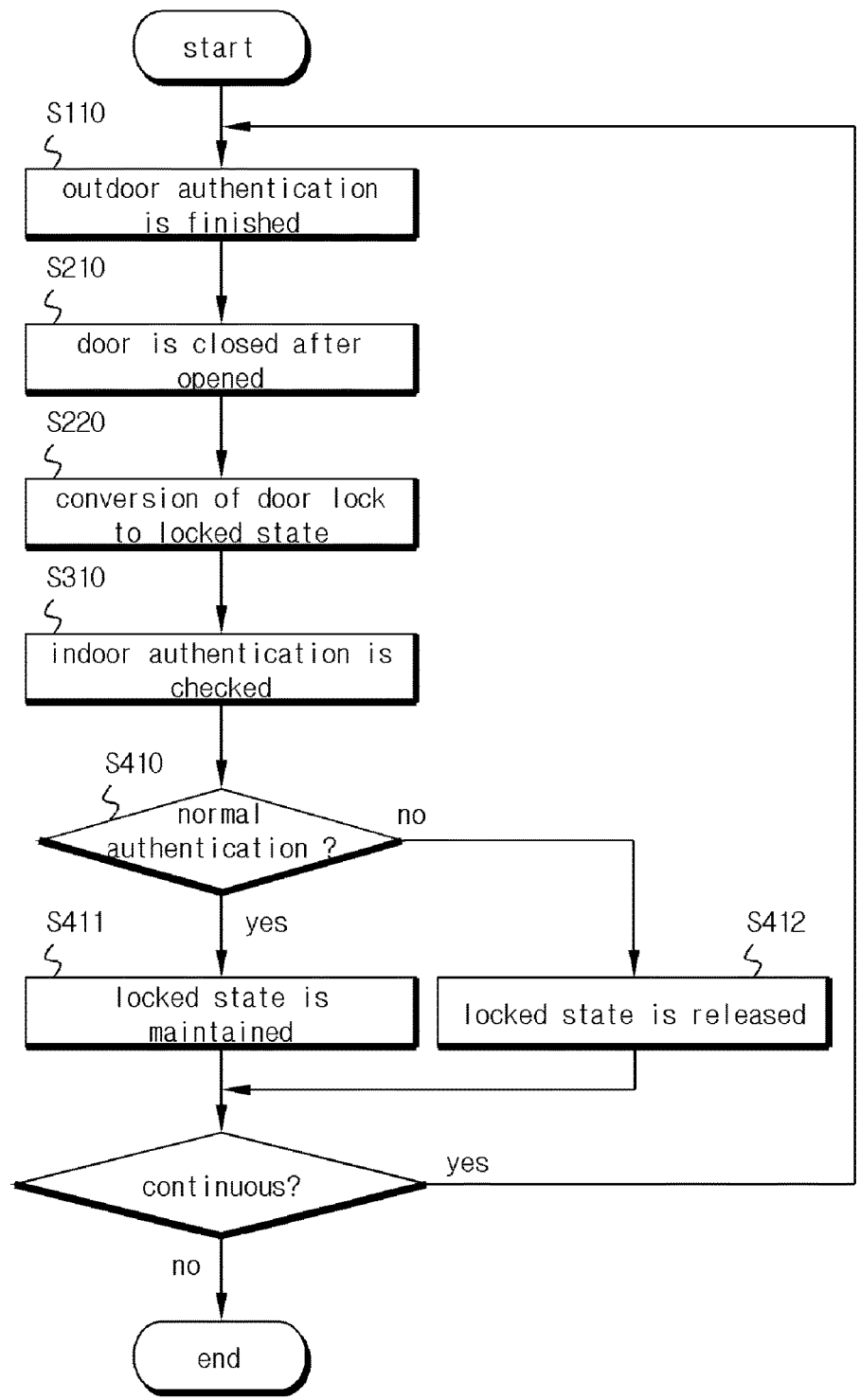
FIGS. 2 to 9 are flowcharts showing detailed use examples of FIG. 1.
Figure 3:
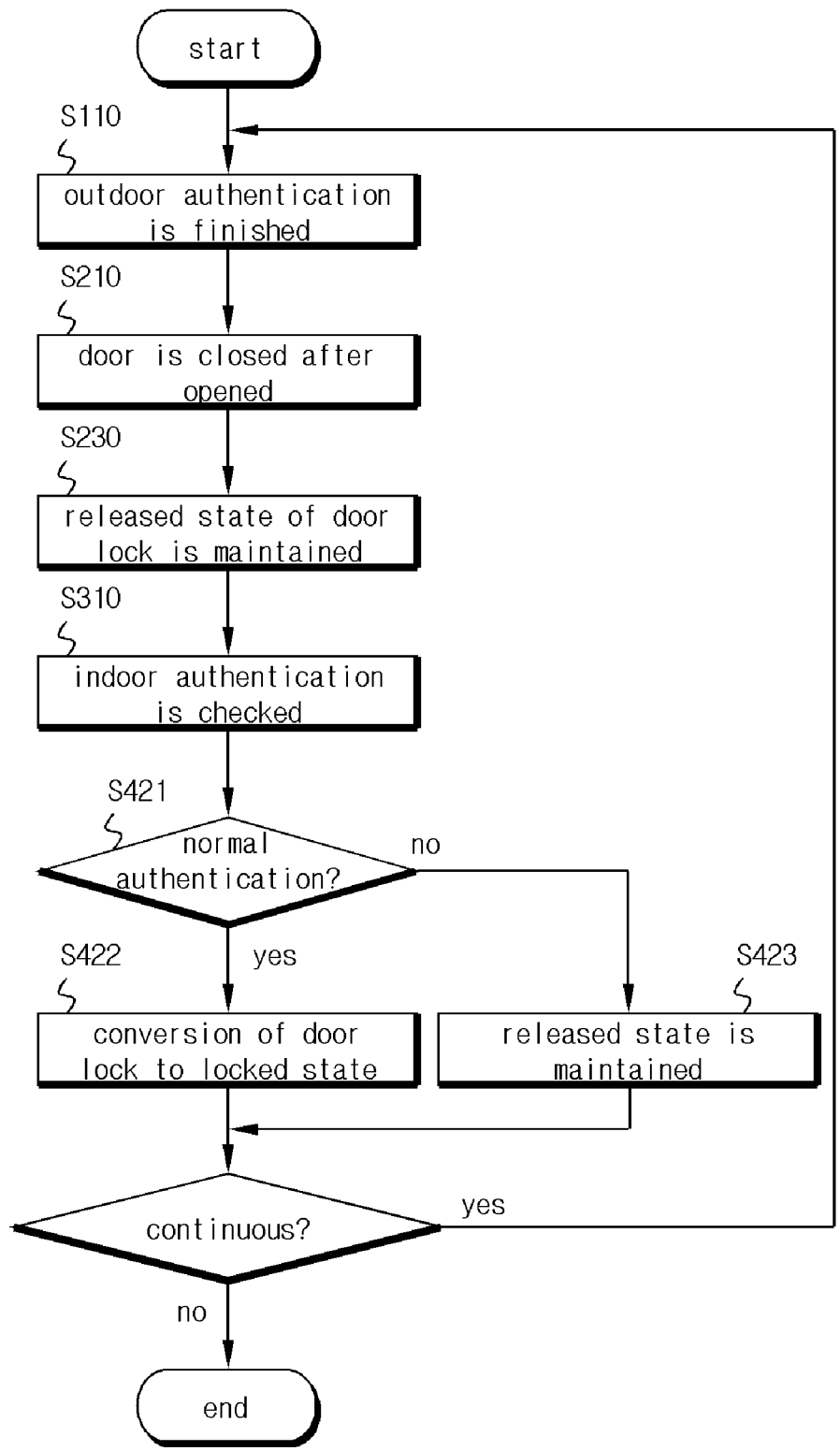

FIGS. 2 and 3 show a situation where the user comes back home, that is, the user enters his or her house from outside, wherein a process for handling a situation where an invader is there is performed according to the pattern of the two-factor authentication.

First, outdoor authentication is finished using outdoor key buttons of the door lock inputted by the user at step S110, and if the user closes the door after opening the door to enter the house at step S210, the released state of the door lock is converted into a locked state at step S220.

In more detail, if the user enters his or her house to close the door in the situation where the user comes back home after going out, the door lock is rapidly operated to the locked state so that the door is not open. In the state where specific situations do not occur, in this case, a period of time required until the door is closed from the time when the user opens the door and enters the house is normal entering time, and if the door is open and closed within the normal entering time, the situation is determined as a normal situation, so that the released state of the door lock is converted into the locked state.

After that, indoor authentication (the second authentication) is performed by the user within a given period of time at step S310, and if the indoor authentication is normally performed at step S410, it is determined that the safety of the user at the indoor side is ensured, thereby allowing the locked state of the door lock to be kept at step S411.

If normal authentication is not performed at the indoor side as the location of the second authentication at the step S410, it is determined that there is an invader or other specific situations occur, and accordingly, the locked state of the door lock is released to obtain a help from the outside at step S412.

After that, if normal second authentication is performed, of course, the released state of the door lock is converted into the locked state.

At this time, as shown in FIG. 3, the door lock is kept released from the locked state at step S230 after the door is open and closed at the step S210, which prevents the situation where the user does not escape outdoors due to the locked state of the door lock upon the emergency situation. Accordingly, it is determined by the user whether the door lock is locked or not.

Like this, if the door lock is kept released from the locked state at the step S230, the released state of the door lock can be converted into the locked state when the normal authentication is performed at the indoor side at step S422, and the door lock is kept released from the locked state when the normal authentication is not performed at the indoor side at step S423.

Figure 4:
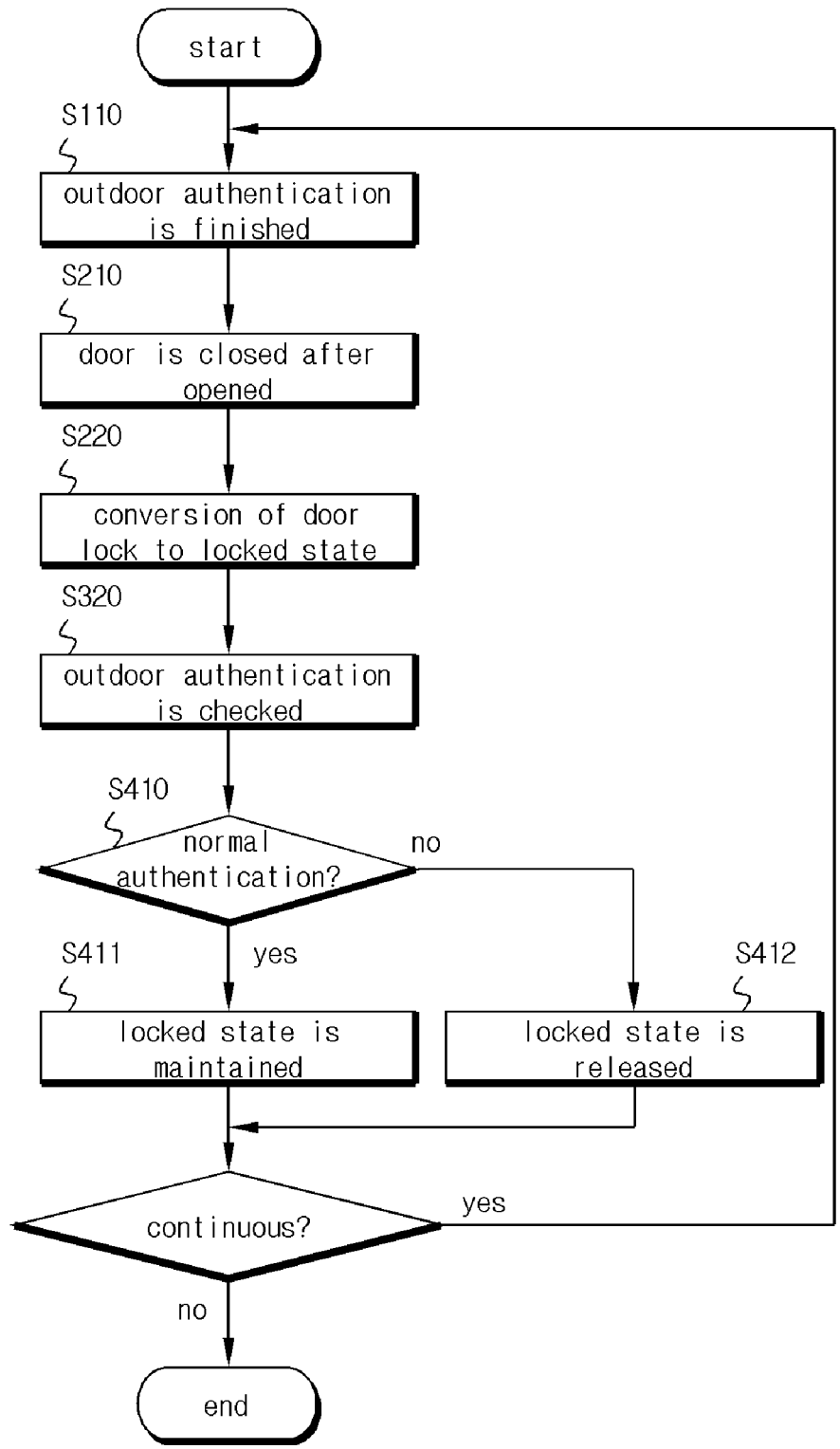
Figure 5:
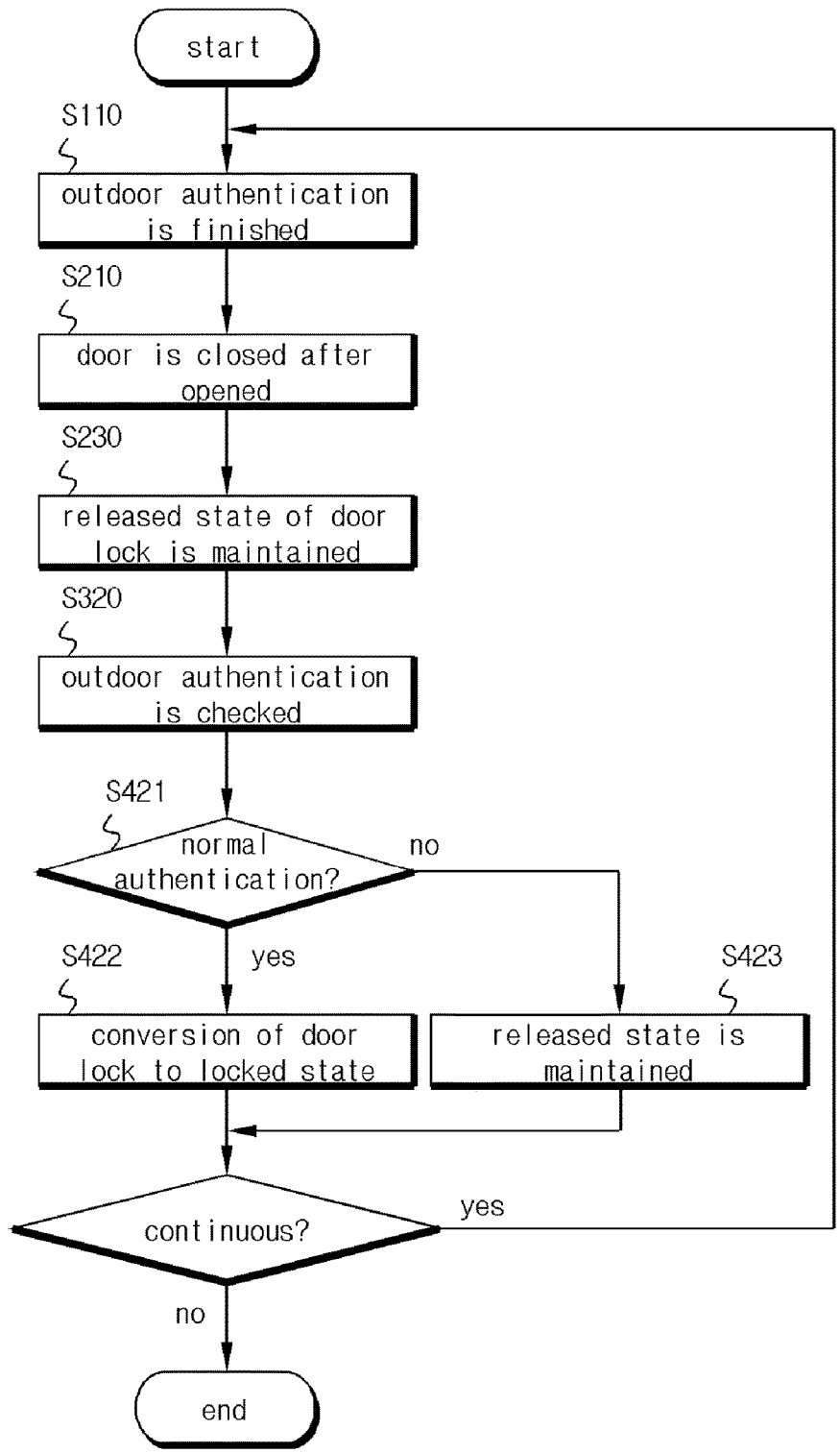

FIGS. 4 and 5 show a situation where a user brings an object to the indoor side from the outdoor side, wherein a process for handling a situation where an invader is there is performed according to the pattern of the two-factor authentication.

First, outdoor authentication is finished using outdoor key buttons of the door lock inputted by the user at the step S110, and if the user closes the door after opening the door to bring a desired object to the indoor side at the step S210, the released state of the door lock is converted into a locked state at the step S220.

In the situation where the user has to go out in the state where he or she holds an object with him or her after goes shopping or does something, in more detail, if the user closes the door after opening the door to bring the object to the inside side, the door lock is rapidly operated to the locked state so that the door is not open.

After that, outdoor authentication (the second authentication) is performed by the user within a given period of time at step S320, and if the outdoor authentication is normally performed at the step S410, the locked state of the door lock is kept at the step S411.

If normal authentication is not performed at the outdoor side as the location of the second authentication at the step S410, it is determined that a specific situation occurs, for example, the user is in danger, and accordingly, the locked state of the door lock is released to permit the user's escape to the indoor side at the step S412.

After that, if third authentication is performed at the indoor side, of course, the released state of the door lock is converted again into the locked state.

At this time, as shown in FIG. 5, the door lock is kept released from the locked state at the step S230 after the door is open and closed at the step S210, which prevents the situation where the user does not escape to the indoor side due to the locked state of the door lock upon the emergent situation wherein the user is in danger. Accordingly, it is determined by the user whether the door lock is locked or not.

Like this, if the door lock is kept released from the locked state at the step S230, the released state of the door lock can be converted into the locked state at the step 422 when the normal authentication is performed at the outdoor side at the step S421, and the door lock is kept released from the locked state when the normal authentication is not performed at the outdoor side at the step S423.

As mentioned above, if third authentication is performed at the indoor side after the user's escape to the indoor side in the dangerous situation, the released state of the door lock can be of course converted again into the locked state.

Figure 6:
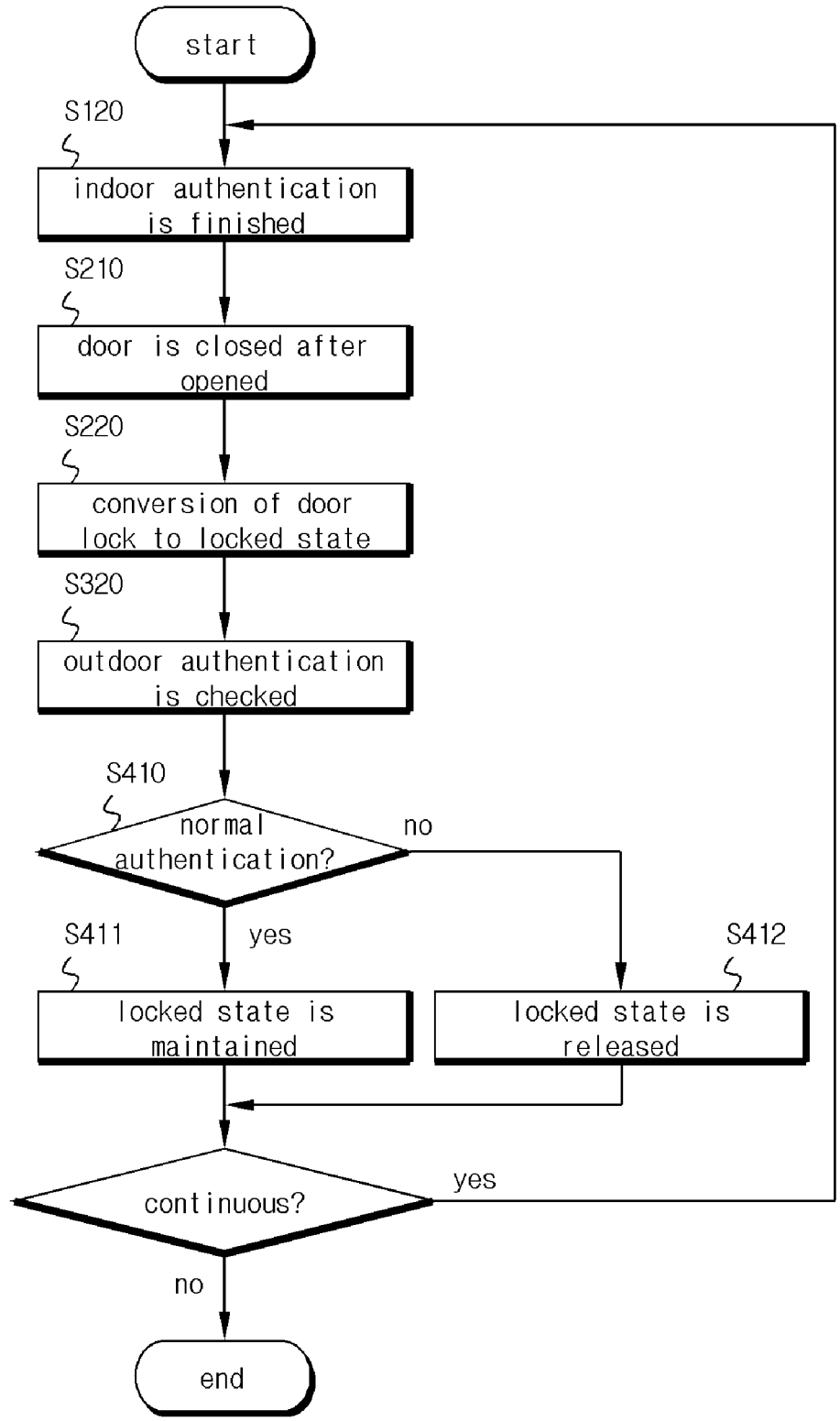
Figure 7:
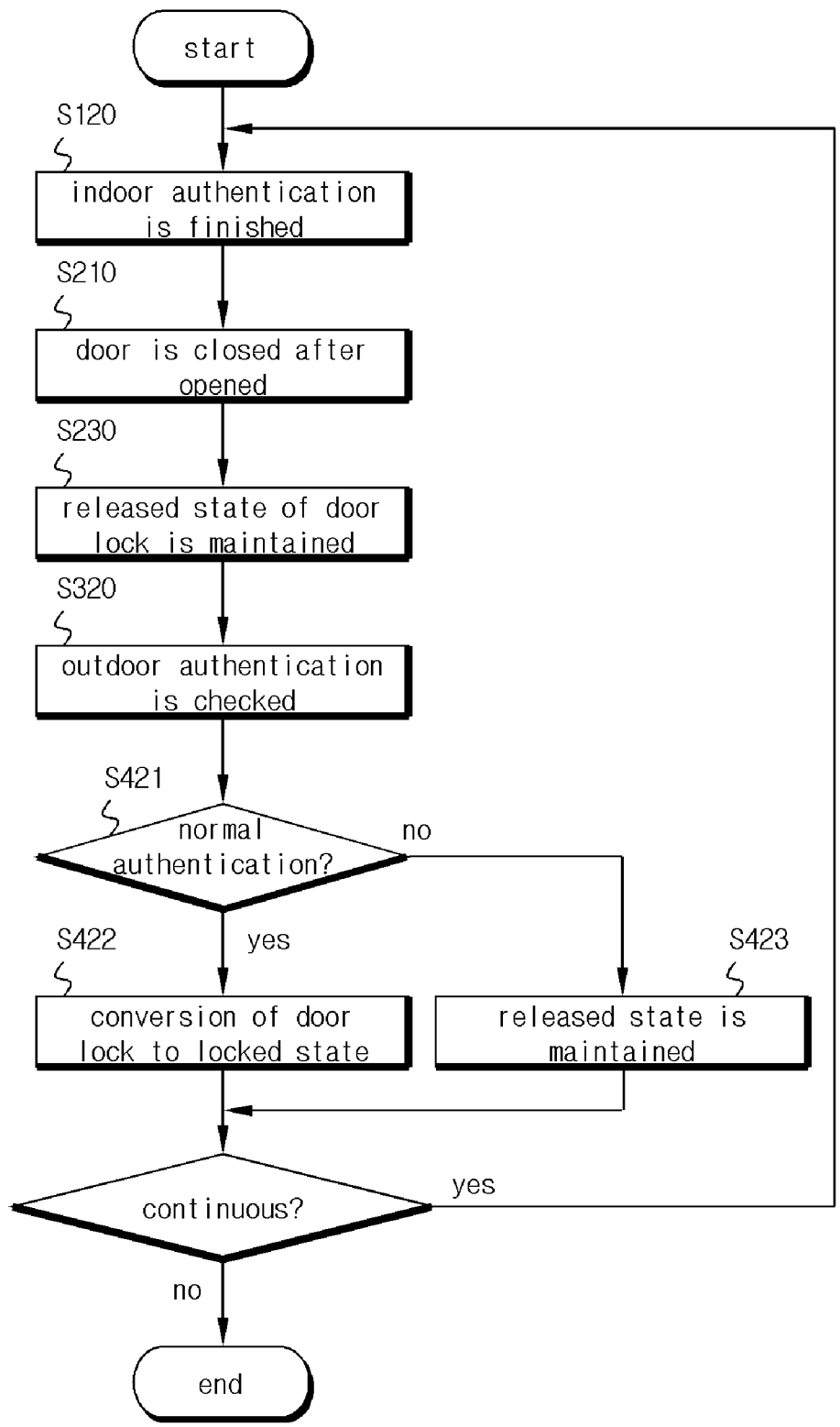

FIGS. 6 and 7 show a situation where the user goes out, that is, the user goes outside from inside.

First, indoor authentication is finished using indoor key buttons of the door lock inputted by the user at step S120, and if the user closes the door after opening the door to go out at the step S210, the released state of the door lock is converted into a locked state at the step S220.

After that, the outdoor authentication (the second authentication) is performed by the user within a given period of time at the step S320, and if the outdoor authentication is normally performed at the step S410, it is determined that the safety of the user at the outdoor side is ensured, thereby allowing the locked state of the door lock to be kept at the step S411.

If normal authentication is not performed at the outdoor side as the location of the second authentication at step S421, it is determined that the user is in danger, and accordingly, the locked state of the door lock is released to allow the user's rapid escape to the indoor side at the step S412.

In the situation where the user escapes to the indoor side to avoid the danger or the user goes out again after the outdoor danger is removed, after that, if the second authentication is normally performed, the released state of the door lock can be converted again into the locked state.

At this time, as shown in FIG. 7, the door lock is kept released from the locked state at the step S230 after the door is open and closed at the step S210. In more detail, in a situation where the user opens the door to go out, even if the door is closed, the door lock is kept released from the locked state. In this case, the reason why the door lock is kept released from the locked state in the situation where the user goes out is that the user escapes to the indoor side rapidly if an invader is in front of the door when the user is out or a dangerous situation occurs in front of the door.

Like this, if the door lock is kept released from the locked state at the step S230, the released state of the door lock can be converted into the locked state at the step 422 when the normal authentication is performed at the outdoor side at the step S421, and the door lock is kept released from the locked state at the step 423 when the normal authentication is not performed at the indoor side at the step S421.

Figure 8:
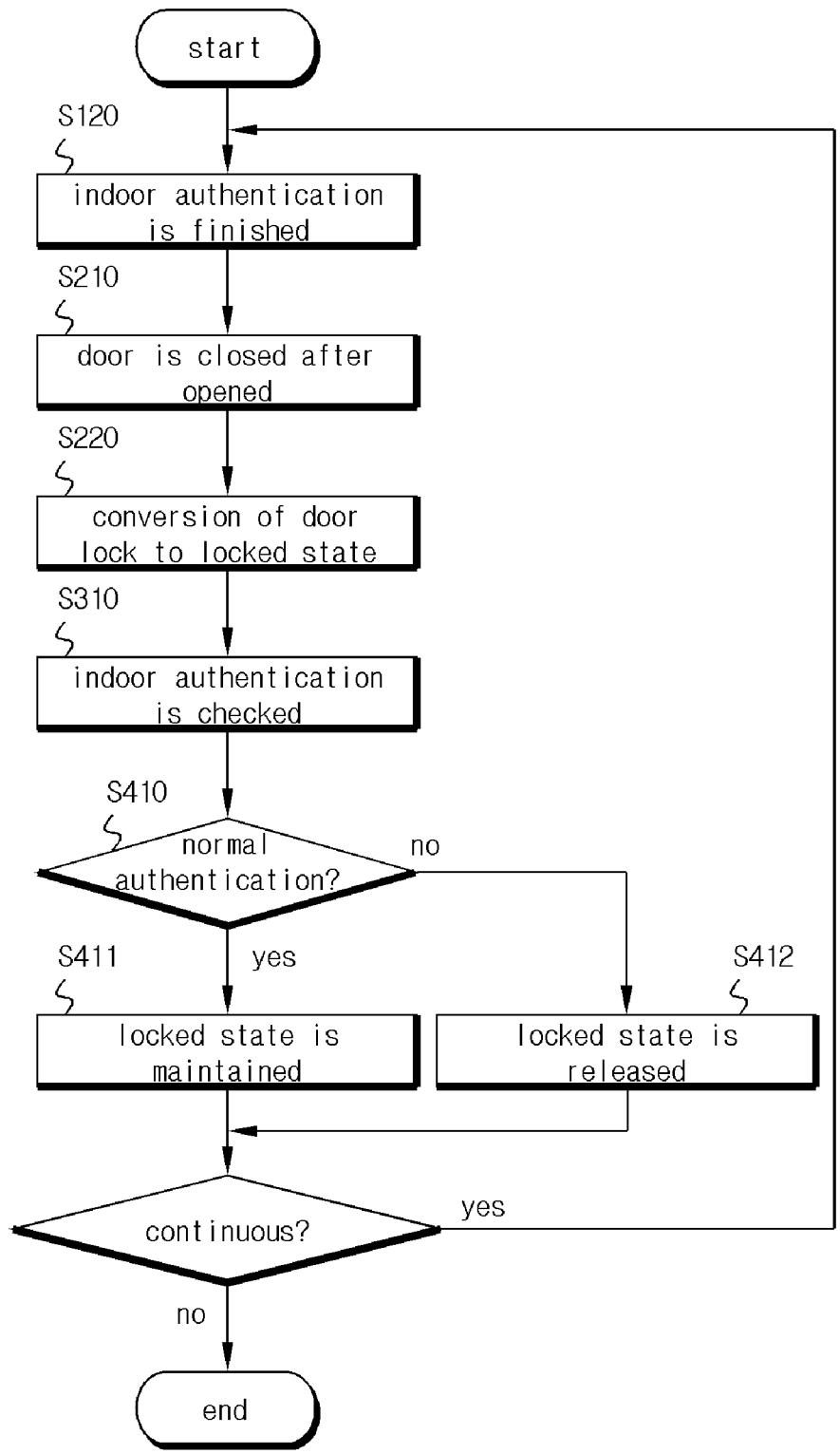
Figure 9:
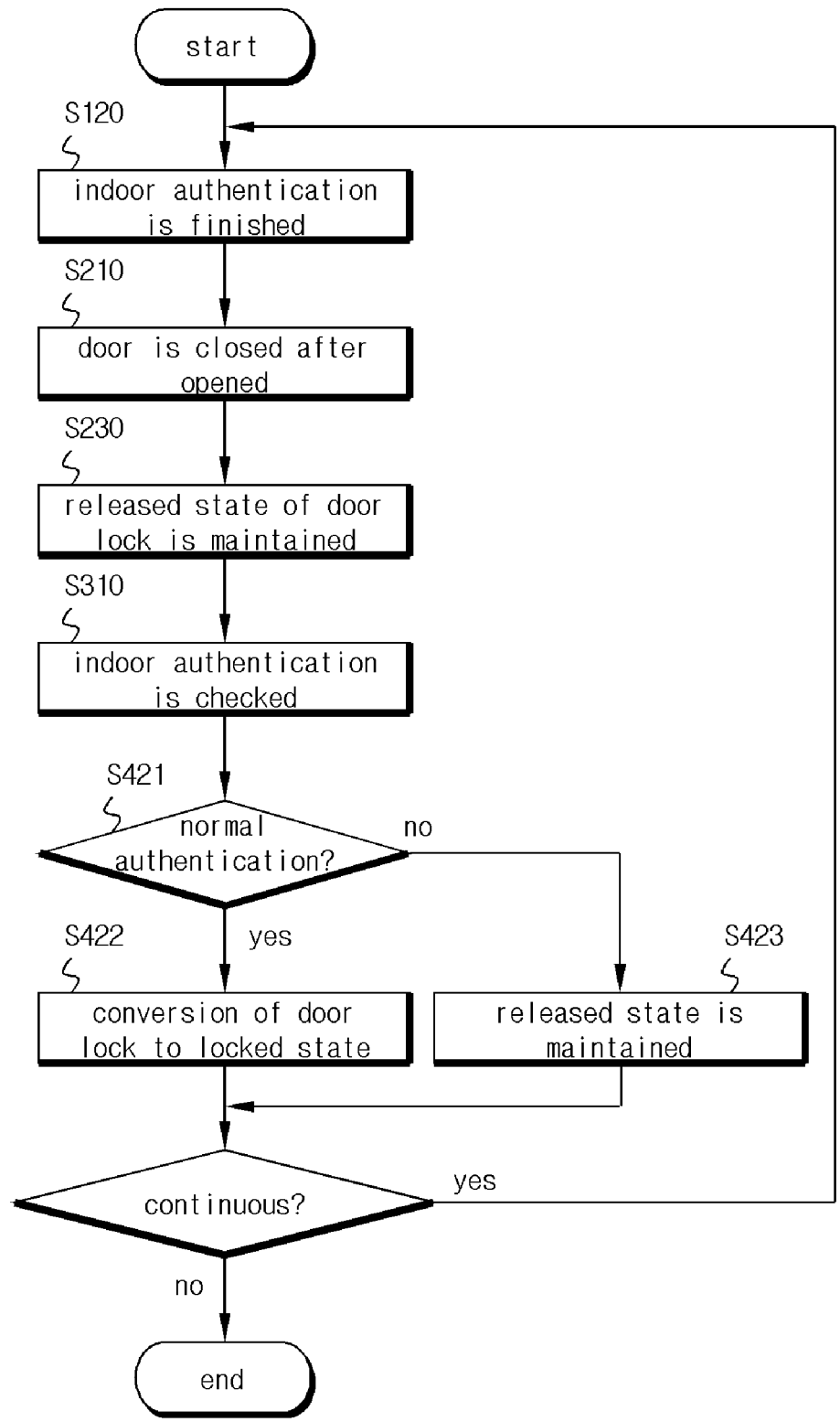

FIGS. 8 and 9 show a situation where a user opens the door to permit a visitor to enter a house or the user opens the door to receive an object from home delivery service, wherein the door is open for a while in the state where the user is at the indoor side.

First, the indoor authentication is finished using the indoor key buttons of the door lock inputted by the user at the step S120, and if the user closes the door after opening the door to bring an object to the indoor side or to permit a visitor to enter the house at the step S210, the released state of the door lock is converted into a locked state at the step S220.

After that, indoor authentication (the second authentication) is performed by the user within a given period of time at step S310, and if the indoor authentication is normally performed at the step S410, it is determined that the safety of the user at the indoor side is ensured, thereby allowing the locked state of the door lock to be kept at the step S411.

If normal authentication is not performed at the indoor side as the location of the second authentication at the step S410, it is determined that the user is in danger by an invader who is disguised as a delivery man, and accordingly, the locked state of the door lock is released at the step S412.

After that, if the normal second authentication is performed at the indoor side, the released state of the door lock is converted again into the locked state.

At this time, as shown in FIG. 9, the door lock is kept released from the locked state at the step S230 after the door is open and closed at the step S210.

Like this, if the door lock is kept released from the locked state at the step S230, the released state of the door lock can be converted into the locked state at the step 422 when the normal authentication is performed at the indoor side at the step S421, and the door lock is kept released from the locked state when the normal authentication is not performed at the indoor side at the step S423.

Accordingly, the operation of the door lock is controlled through the authentication pattern according to various situations, thereby preventing the user from being trapped in an indoor space in the state of being disconnected to the outside upon the emergency situation and allowing the user to request someone outside of the house to help him or her to protect his or her properties and body from the invader.

Figure 10:
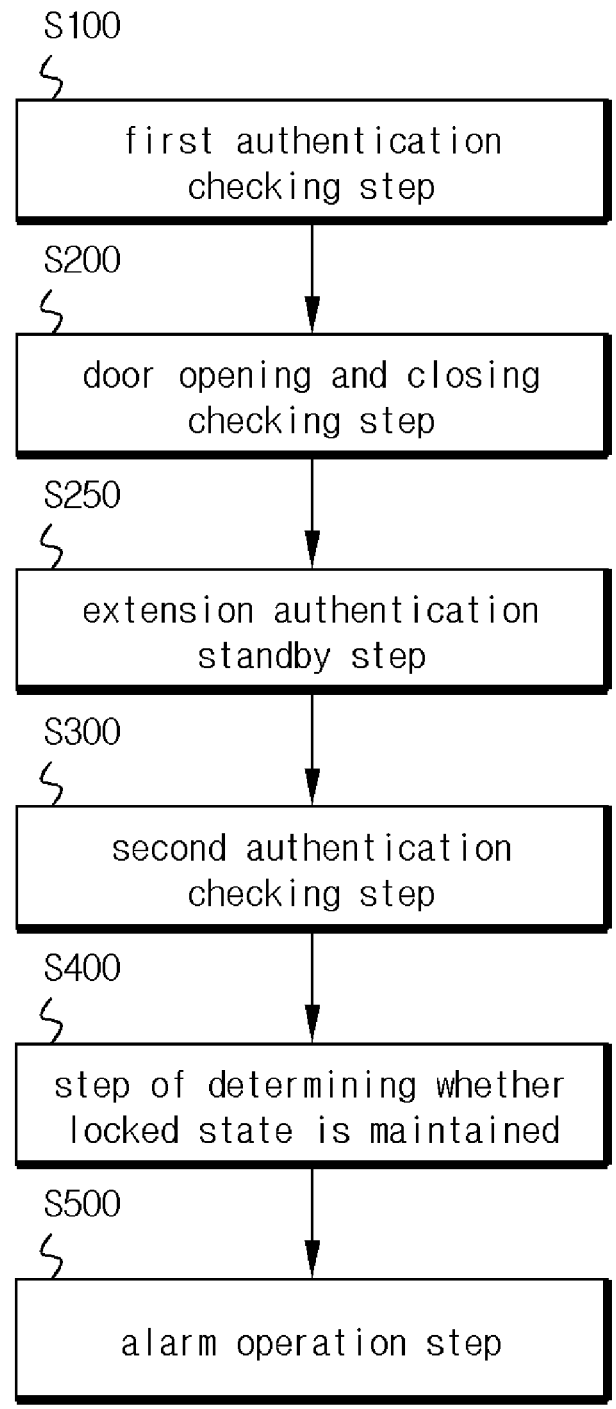
FIG. 10 is a flowchart showing a two-factor authentication pattern-based door lock control method according to a second embodiment of the present invention.

FIG. 10 is a flowchart showing a two-factor authentication pattern-based door lock control method according to a second embodiment of the present invention.

As shown in FIG. 10, the two-factor authentication pattern-based door lock control method according to the second embodiment of the present invention further includes an extension authentication standby step S250 and an alarm operation performing step S500.

The extension authentication standby step S250 is a step of standing by extension authentication through which the second authentication is extendedly performed after a given period of time if the given period of time is passed in the state where the door is open, and in this case, the extension authentication standby step S250 is performed if there is a need to open the door for the given period of time under the request of the user.

For example, if an object through home delivery service is placed in front of the door when the user comes back home, there is a need to open the door for a given period of time to bring the object to the indoor side. For another example, there is a need to open the door for a given period of time to put trash or recyclables out. For yet another example, there is a need to open the door for a given period of time to bring an object delivered through home delivery service or brought by a visitor to the indoor side.

The extension authentication standby step S250 will be in more detail explained below.

The alarm operation performing step S500 is a step of performing an alarm operation according to a given alarm process under the determination where the user is in danger if the locked state of the door lock is released or the door lock is kept released from the locked state according to the corresponding situations through the step S400 of determining whether the locked state is maintained.

Figure 11:
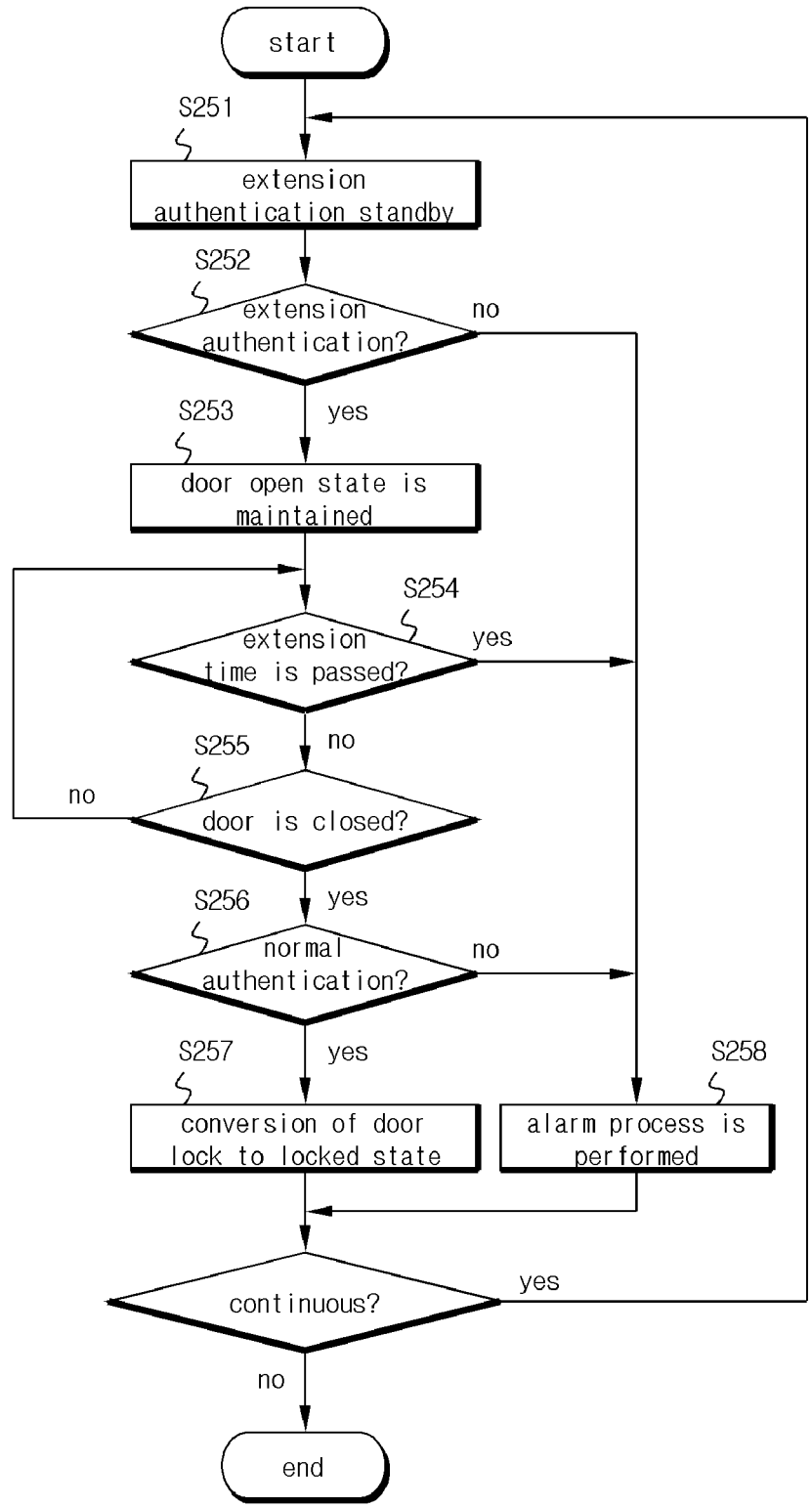
FIG. 11 is a flowchart showing a detailed use example of step S250 of FIG. 10.

FIG. 11 is a flowchart showing a detailed use example of step S250 of FIG. 10.

As shown in FIG. 11, if the door is open after the first authentication is performed, the extension authentication stands by during a given period of time at step S251.

At this time, if the extension authentication is normally performed at step S252, a current state where the door is open during set extension time from the time when the door is open is maintained at step S253. In more detail, no separate step such as the second authentication checking step is performed during the extension time.

After that, if the door is closed at step S255 before the extension time is passed at step S254, the second authentication such as the indoor authentication or the outdoor authentication stands by during a given period of time, and if the second authentication is normally performed by the user at step S256, it is determined that the user's desired something to do is finished, thereby allowing the released state of the door lock to be converted into the locked state at step S257.

If the extension time is passed at the step S254 or if the second authentication is not normally performed at the step S256 after the door is closed at the step S255, it is determined that the user is in danger, thereby performing the alarm process as will be discussed below at step S258.

Figure 12:
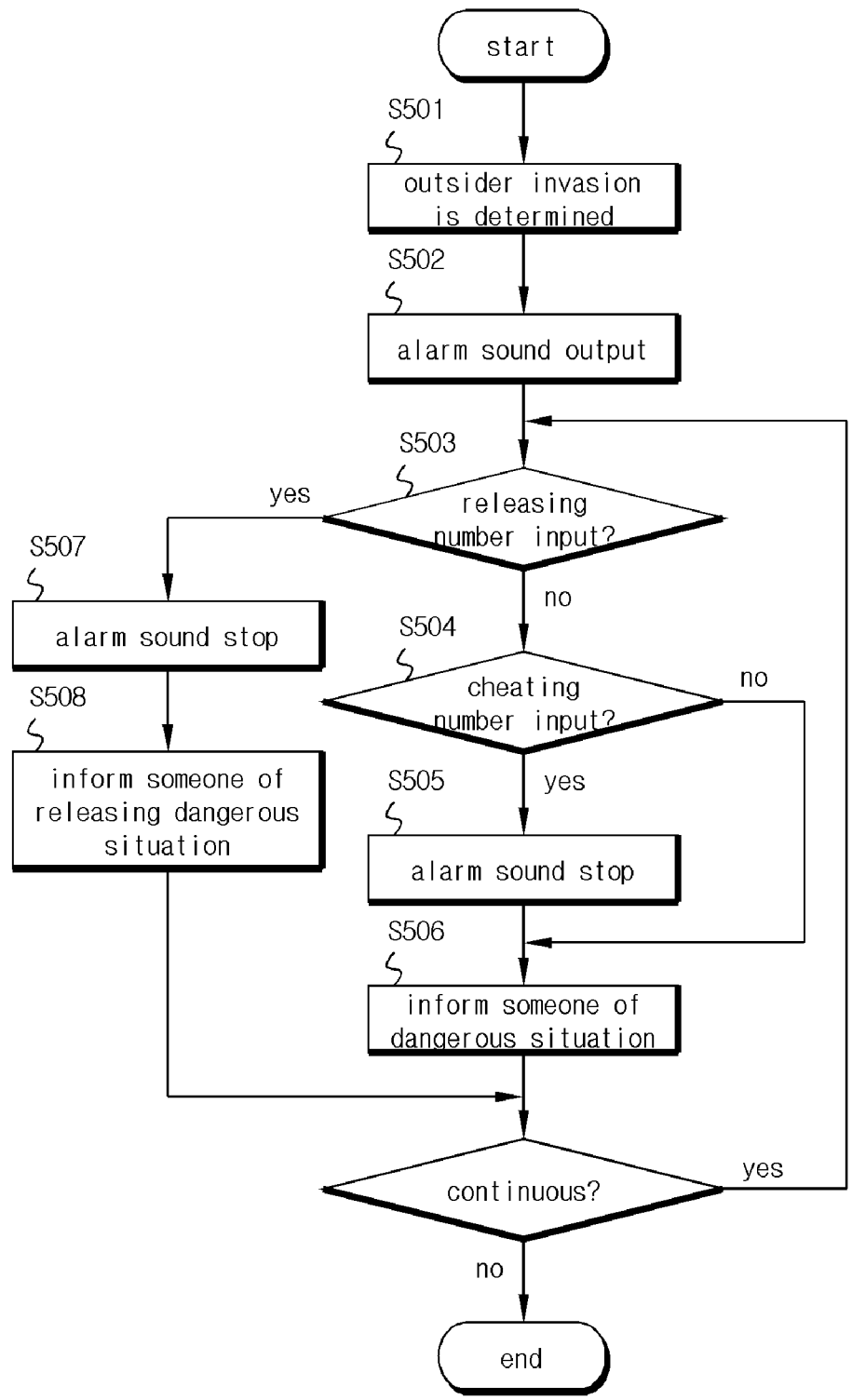
FIG. 12 is a flowchart showing a detailed use example of step S500 of FIG. 10.

FIG. 12 is a flowchart showing a detailed use example of step S500 of FIG. 10.

As shown in FIG. 12, if it is determined that the user is in danger according to the corresponding situation as shown in FIG. 11, the control module determines that a dangerous situation occurs, for example, an invader enters the house at step S501 and performs an alarm operation like an alarm sound output according to the alarm process at step S502.

At this time, if the current situation occurs by the delay of the second authentication, that is, if no dangerous situation occurs, for example, no invader enters the house, the alarm operation is released by the user at step S503.

After that, if the second authentication is performed or separate releasing numbers are inputted at step S503, the control module stops outputting the alarm sound at step S507 to inform a helper or company related thereto at step S508 of releasing the dangerous situation. In this case, the helper includes an acquaintance, a neighbor, a security staff, a guard, a policeman, and so on. Also, releasing the alarm operation is not limited to a releasing number inputting method through key buttons, and further, of course, it may be freely changed to various authentication methods under the request of a person having ordinary skill in the art.

On the other hand, if the alarm sound is generated in a situation where an invader enters the house, it may be released forcedly by threat of the invader.

Accordingly, if cheating numbers are inputted by the user to deceive the invader at step S504, an external alarm operation like the alarm sound output stops at step S505, but an internal alarm operation of informing the helper or related company of the dangerous situation is performed at step S506.

Accordingly, the door lock according to the present invention is operated as if it is released externally from the alarm state, thereby inducing the relief of the invader, but it informs the helper like the acquaintance or neighbor or the related company (security company), police office, or guard room of the emergency situation, thereby rapidly oppressing the invader.

Even if both of the releasing numbers and the cheating numbers are not inputted after the alarm sound is outputted at the step S502, of course, the door lock can inform the helper or the related company of the emergency situation.

Figure 13:
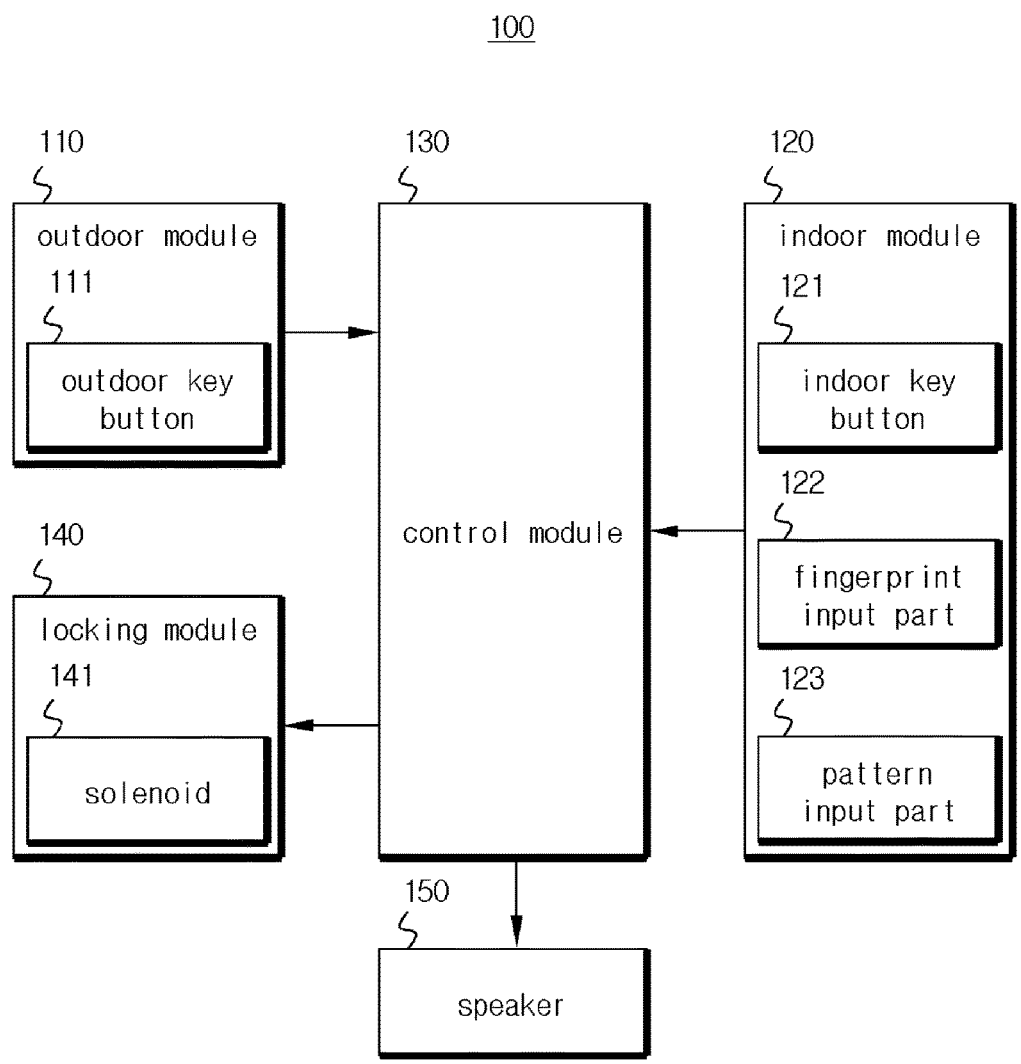
FIG. 13 is a block diagram showing a two-factor authentication pattern-based door lock according to a third embodiment of the present invention.

FIG. 13 is a block diagram showing a two-factor authentication pattern-based door lock according to a third embodiment of the present invention.

As shown in FIG. 13, the two-factor authentication pattern-based door lock 100 according to a third embodiment of the present invention largely includes an outdoor module 110, an indoor module 120, a control module 130, a locking module 140, and a speaker 150.

The outdoor module 110 receives outdoor authentication information through a user's manipulation and includes outdoor key buttons 111.

The indoor module 120 receives indoor authentication information through the user's manipulation and includes indoor key buttons 121 to which number information is inputted. Under the request of a person having ordinary skill n the art, further, the indoor module 120 includes at least one of a fingerprint input part 122 having an optical sensor adapted to obtain the user's fingerprint information and a pattern input part 123 having a touchscreen adapted to receive a specific pattern.

Of course, the fingerprint input part 122 and the pattern input part 123 disposed on the indoor module 120 may be disposed on the outdoor module 110.

As mentioned above, the indoor module 120 performs the cheating authentication to deceive the invader, and to this end, the indoor module 120 has two or more authentication means, so that the releasing operation or the cheating operation may be performed according to the order of the respective authentication means.

Of course, as shown in FIG. 12, the releasing operation or the cheating operation may be performed through the indoor key buttons 121 as one authentication means, and otherwise, the releasing operation (fingerprint authentication of thumb) or the cheating operation (fingerprint authentication of index finger) may be performed through the fingerprint input part 122.

The control module 130 checks the time order of the authentication performed by the outdoor module 110 and the indoor module 120 and checks the location of the second authentication on the basis of the location of the first authentication, the opening and closing of the door, the checked result for the performance of the second authentication, and the location of the second authentication, so that the control module 130 determines whether the locked state of the door lock is maintained and the alarm operation by the alarm process is performed according to the door lock control method as shown in FIGS. 1 to 12.

The locking module 140 controls the locked state of the door in such a manner as to allow the door to be converted to the locked state or the released state from the locked state by means of an operation of a solenoid 141.

The speaker 150 outputs the alarm sound, and if necessary, the speaker 150 outputs voice. For example, if the door lock is connected to a guard room when an emergency situation occurs, it can have voice communication with the guard, and to this end, the door lock further includes a microphone.

So as to disguise the invader with the voice communication with the outside, especially, guide voice messages such as 'we got your dangerous situation', 'we will reach within five minutes', thereby inducing the invader to run away.

Accordingly, the two-factor authentication door lock 100 as shown in FIG. 13 is operated by the control method as shown in FIGS. 1 to 12, thereby safely protecting the user's properties and body from the dangerous situation where the invader enters the house.

So as to prepare the case where the invader has entered before the user comes back home, further, the indoor authentication is performed after all of indoor spaces are checked by the user, and at this time, there is no need to approach the door lock again to perform the indoor authentication. That is, the indoor authentication is performed using a remote controller placed in the house or his or her own smart phone.

Figure 14:
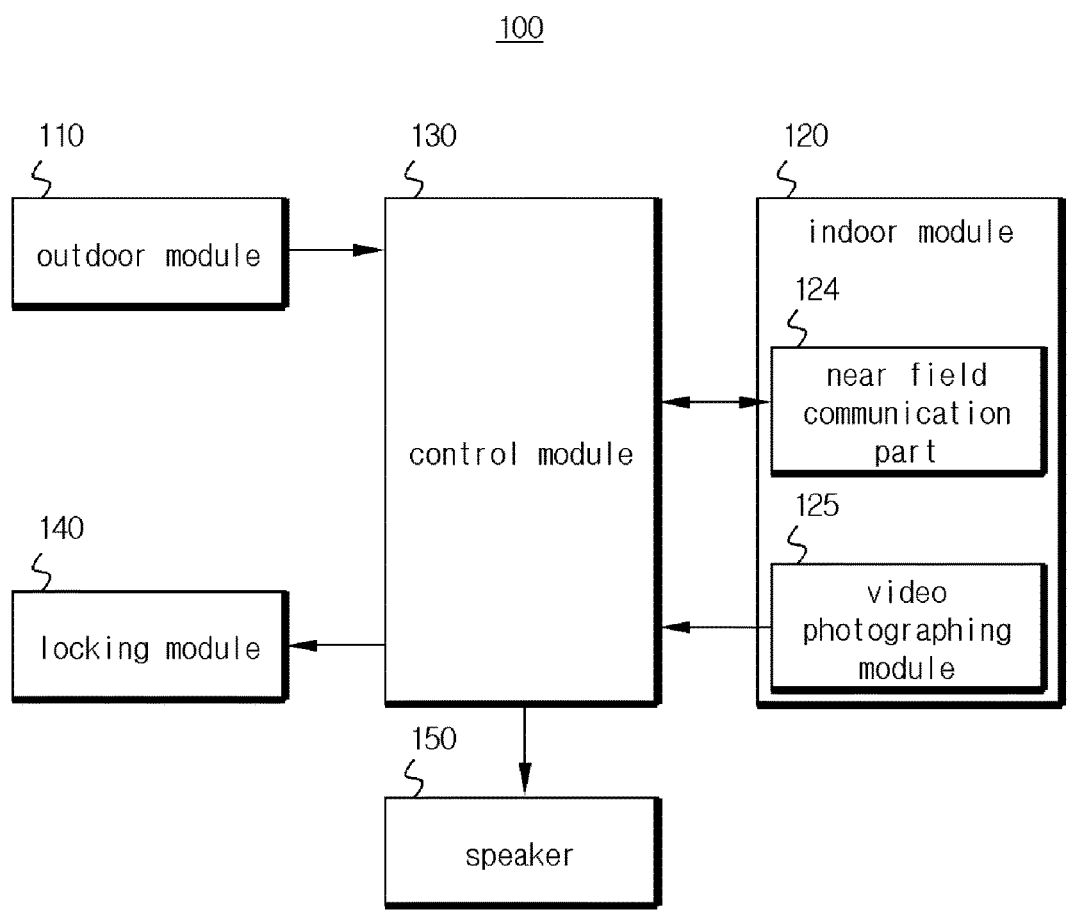
FIG. 14 is a block diagram showing a two-factor authentication pattern-based door lock according to a fourth embodiment of the present invention.
Figure 15:
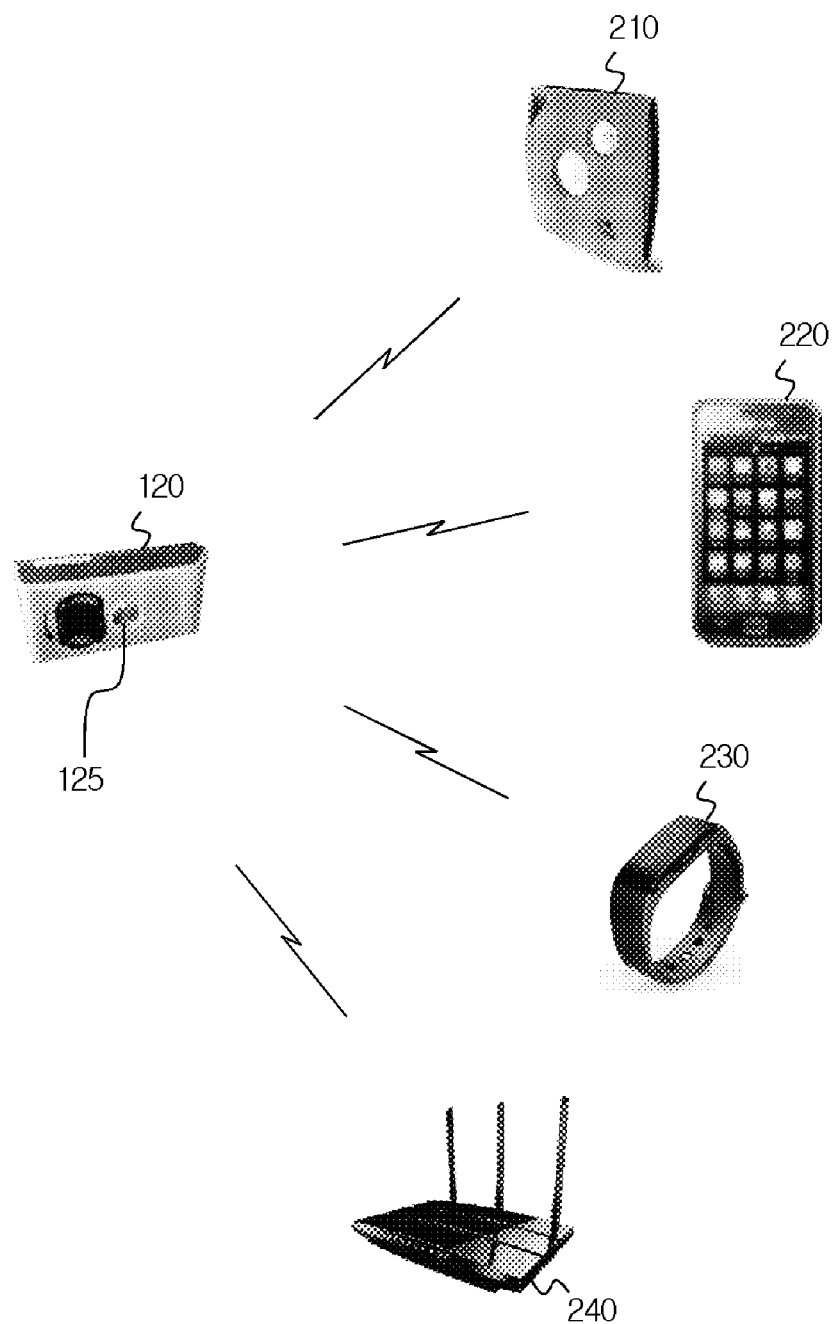
FIG. 15 shows examples of utilizing the door lock of FIG. 14.

FIG. 14 is a block diagram showing a two-factor authentication pattern-based door lock according to a fourth embodiment of the present invention, and FIG. 15 shows examples of utilizing the door lock of FIG. 14.

As shown in FIG. 14, the indoor module 120 further includes a near field communication part 124, and as shown in FIG. 15, the near field communication part 124 is connected to a wireless remote controller 210 and a smart device such as a smart phone 220 and a smart watch 230.

After the indoor spaces are checked by the user, accordingly, the indoor authentication is performed using the wireless remote controller 210 or the smart device, thereby permitting the released state of the door lock to be converted into the locked state.

Further, as shown in FIGS. 14 and 15, the two-factor authentication pattern-based door lock 100 according to the fourth embodiment of the present invention is automatically connected to the acquaintance (helper) or the related company (security company) with the voice communication through the user's smart phone when an emergency situation occurs, thereby informing the helper or related company of the emergency situation.

To this end, the user applies at least one of communication connection right and text message sending right to the control module 130 using his or her smart phone 220.

Accordingly, if the indoor authentication fails so that the released state of the locking module 140 is kept, the control module 130 controls the smart phone 220 and performs the voice communication of the smart phone 220 with a voice communication terminal of the related company according to the right pre-applied thereto and communication connection information. In this case, the communication connection information includes telephone numbers of the voice communication terminal of the related company.

Further, as shown in FIG. 15, the near field communication part 124 is connected to a wireless router 240, thereby informing an outsider of the dangerous situation through internet network.

At this time, the two-factor authentication pattern-based door lock 100 according to the fourth embodiment of the present invention further includes a video photographing module 125 for photographing the indoor side, and if the video of the indoor side photographed by the video photographing module 125 is transmitted to the control module 130, the control module 130 is connected to the internet network by the connection to the wireless router 240 through the near field communication part 124, thereby transmitting the corresponding video to a set internet address. In this case, the set internet address includes a security company server, police office server, and so on.

Further, the indoor module 120 includes an LED lamp (not shown) so that while the video is being photographed, the LED lamp is turned on to allow the invader to recognize that the current situation is being photographed, thereby inducing the invader to run away.

As described above, the present invention maintains the locked state of the door lock through the additional authentication of the user in the state where the indoor space is safe after he or she comes back home, and if the additional authentication of the user is not performed, converts the locked state of the door lock to the released state thereof to allow the user to have a help from an outsider (acquaintance, neighbor, security staff, guard, police officer, fire fighter, and so on) in a dangerous situation.

In addition, the present invention copes with various situations where an invader pushes the user and enters the user's house together with the user at the moment when the user goes out or where a visitor enters the user's house at the moment when the user checks the visitor as an outsider at the inside of the house, thereby being active in coping with the situations to prevent various crimes.

In more detail, the present invention adds the authentication means to the indoor module of the door lock and after checking the outdoor authentication, the opening and closing of the door, and the indoor authentication, converts the released state of the door lock to the locked state thereof or maintains the locked state of the door lock according to the checked results. However, if the indoor authentication is not performed for a given period of time, the present invention requests an outsider to help the user through alarm sound, together with voice communication and text message sending.

Accordingly, even if the user (resident) does not recognize the invasion of the outsider or does not cope with the invasion, the present invention maintains the released state of the door lock or releases the locked state of the door lock, thereby obtaining a help from the outsider to oppress the invader in the emergency situation.

Accordingly, the present invention rapidly copes with the dangerous situation through the alarm sound output and the automatic connection of voice communication to the outside (guard room, security company, police office, and so on), thereby inducing the invader to run away and protecting the user's properties and body from the dangerous situation.

Further, the present invention makes use of a door lock, a device basically used like a smart phone, and communication network (voice communication and data communication), without any separate security devices or facilities, thereby minimizing the cost required for installation and operation.

Especially, the present invention obtains high security and crime prevention effects with low-priced equipment, even in a crime prevention vulnerable area, where it is hard to operate a high-priced crime prevention system, like studio apartments only for women wherein a woman lives alone.

The present invention improves reliability and competitiveness in fields of door locks and security and crime prevention, especially in fields of security and crime prevention using door locks.

As mentioned above, the two-factor authentication pattern-based door lock control method and the two-factor authentication pattern-based door lock according to the preferred embodiments of the present invention have been explained. It is to be appreciated that those skilled in the art can change or modify the embodiments without departing from the scope and spirit of the present invention.

While the present invention has been described with reference to the particular illustrative embodiments, therefore, it is not to be restricted by the embodiments but only by the appended claims.

What is claimed is:

1. A two-factor authentication pattern-based door lock control method, comprising:

a first authentication checking step of checking justification and a location of a first authentication as the corresponding authentication in the case any one of outdoor authentication and indoor authentication is normally performed;

a door opening and closing checking step of checking whether a door is open and closed sequentially;

a second authentication checking step of checking whether a second authentication is performed within a given period of time after the door is open or closed and of checking a location where the second authentication is performed; and a step of determining whether a locked state of a door lock is maintained, on the basis of the checked location of the first authentication, the checked door opening and closing, the checked result for the performance of the second authentication, and the location of the second authentication.

2. The door lock control method according to claim 1, wherein the step of determining whether the locked state of the door lock is maintained is performed by converting a released state of the door lock into the locked state if the location of the first authentication is an outdoor side and the opening and closing of the door are performed within normal entering time, maintaining the locked state of the door lock if a normal authentication is performed at an indoor side as the location of the second authentication, and by releasing the locked state of the door lock if the normal authentication is not performed at the indoor side as the location of the second authentication.

3. The door lock control method according to claim 1, wherein the step of determining whether the locked state of the door lock is maintained is performed by maintaining a released state of the door lock if the location of the first authentication is an outdoor side and the opening and closing of the door are performed within normal entering time, converting the released state of the door lock into the locked state if a normal authentication is performed at an indoor side as the location of the second authentication, and by maintaining the released state of the door lock if the normal authentication is not performed at the indoor side as the location of the second authentication.

4. The door lock control method according to claim 1, wherein the step of determining whether the locked state of the door lock is maintained is performed by converting a released state of the door lock into the locked state if the location of the first authentication is an outdoor side and the opening and closing of the door are performed within normal entering time, maintaining the locked state of the door lock if a normal authentication is performed at an outdoor side as the location of the second authentication, and by releasing the locked state of the door lock if the normal authentication is not performed at the outdoor side as the location of the second authentication.

5. The door lock control method according to claim 1, wherein the step of determining whether the locked state of the door lock is maintained is performed by maintaining a released state of the door lock if the location of the first authentication is an outdoor side and the opening and closing of the door are performed within normal entering time, converting the released state of the door lock into the locked state if a normal authentication is performed at an outdoor side as the location of the second authentication, and by maintaining the released state of the door lock if the normal authentication is not performed at the outdoor side as the location of the second authentication.

6. The door lock control method according to claim 1, wherein the step of determining whether the locked state of the door lock is maintained is performed by converting a released state of the door lock into the locked state if the location of the first authentication is an indoor side and the opening and closing of the door are performed within normal entering time, maintaining the locked state of the door lock if a normal authentication is performed at an outdoor side as the location of the second authentication, and by releasing the locked state of the door lock if the normal authentication is not performed at the outdoor side as the location of the second authentication.

7. The door lock control method according to claim 1, wherein the step of determining whether the locked state of the door lock is maintained is performed by maintaining a released state of the door lock if the location of the first authentication is an indoor side and the opening and closing of the door are performed within normal entering time, converting the released state of the door lock into the locked state if a normal authentication is performed at an outdoor side as the location of the second authentication, and by maintaining the released state of the door lock if the normal authentication is not performed at the outdoor side as the location of the second authentication.

8. The door lock control method according to claim 1, wherein the step of determining whether the locked state of the door lock is maintained is performed by converting a released state of the door lock into the locked state if the location of the first authentication is an indoor side and the opening and closing of the door are performed within normal entering time, maintaining the locked state of the door lock if a normal authentication is performed at an indoor side as the location of the second authentication, and by releasing the locked state of the door lock if the normal authentication is not performed at the indoor side as the location of the second authentication.

9. The door lock control method according to claim 1, wherein the step of determining whether the locked state of the door lock is maintained is performed by maintaining a released state of the door lock if the location of the first authentication is an indoor side and the opening and closing of the door are performed within normal entering time, converting the released state of the door lock into the locked state if a normal authentication is performed at an indoor side as the location of the second authentication, and by maintaining the released state of the door lock if the normal authentication is not performed at the indoor side as the location of the second authentication.

10. The door lock control method according to claim 1, further comprising an extension authentication standby step of standing by an extension authentication through which the second authentication is extendedly performed after a given period of time if the given period of time is passed in a state where the door is open, the extension authentication standby step being performed by maintaining a current state during set extension time after the door is open if the extension authentication is normally performed and by performing an alarm operation according a set alarm processor if the extension authentication is not normally performed.

* * * * *